(12) United States Patent
Tokumasu

(10) Patent No.: US 12,301,133 B2
(45) Date of Patent: May 13, 2025

(54) CONTROL CIRCUIT FOR POWER CONVERTER AND HAVING STARTUP DETERMINING UNIT

(71) Applicant: DENSO CORPORATION, Kariya (JP)

(72) Inventor: Akira Tokumasu, Kariya (JP)

(73) Assignee: DENSO CORPORATION, Kariya (JP)

( * ) Notice: Subject to any disclaimer, the term of this patent is extended or adjusted under 35 U.S.C. 154(b) by 265 days.

(21) Appl. No.: 17/976,014

(22) Filed: Oct. 28, 2022

(65) Prior Publication Data

US 2023/0052466 A1 Feb. 16, 2023

Related U.S. Application Data

(63) Continuation of application No. PCT/JP2021/016164, filed on Apr. 21, 2021.

(30) Foreign Application Priority Data

Apr. 28, 2020 (JP) .................... 2020-079442

(51) Int. Cl.
*H02M 7/537* (2006.01)
*B60L 3/00* (2019.01)
(Continued)

(52) U.S. Cl.
CPC .......... *H02M 7/537* (2013.01); *B60L 3/0023* (2013.01); *B60L 50/51* (2019.02); *H02P 25/22* (2013.01);
(Continued)

(58) Field of Classification Search
CPC .......... H02M 7/537; H02M 7/48; H02M 1/32; H02M 1/00
See application file for complete search history.

(56) References Cited

U.S. PATENT DOCUMENTS

2012/0223575 A1* 9/2012 Hachiya .................. B60L 58/20
307/9.1
2015/0375626 A1* 12/2015 Hachiya .................. B60L 53/11
307/10.1
(Continued)

FOREIGN PATENT DOCUMENTS

CN 111213312 A * 5/2020 ............. G01R 15/04
JP 2017-118815 A 6/2017
(Continued)

*Primary Examiner* — Sisay G Tiku
(74) *Attorney, Agent, or Firm* — Oliff PLC

(57) ABSTRACT

A control circuit for a power converter that configures a system that is mounted to a vehicle and includes a rotating electric machine that has multiple phases and includes a rotor that is capable of transmitting power to and from a drive wheel, and the power converter that includes upper- and lower-arm switches that are electrically connected to phase windings of the rotating electric machine. The control circuit determines whether an abnormality has occurred in the system, determines whether the system has been started based on an output voltage of the insulating power supply, and performs short-circuit control to turn on an on-side switch that is either one of the upper- and lower-arm switches and to turn off an off-side switch that is the other of the upper- and lower-arm switches, in response to the system being determined to have been started, and the abnormality being determined to have occurred.

18 Claims, 11 Drawing Sheets

(51) Int. Cl.
  *B60L 50/51*     (2019.01)
  *H02M 1/00*      (2007.01)
  *H02M 1/32*      (2007.01)
  *H02P 25/22*     (2006.01)
  *H02P 27/06*     (2006.01)

(52) U.S. Cl.
  CPC ........... *H02P 27/06* (2013.01); *B60L 2210/10* (2013.01); *B60L 2210/40* (2013.01)

(56) References Cited

U.S. PATENT DOCUMENTS

| | | | |
|---|---|---|---|
| 2016/0243946 | A1 | 8/2016 | Toda et al. |
| 2019/0123732 | A1* | 4/2019 | Asako ................ H03K 17/0828 |
| 2021/0288604 | A1* | 9/2021 | Kondo .................... B60L 3/003 |
| 2022/0393504 | A1* | 12/2022 | Nishibata ............ H02P 29/0243 |
| 2022/0393572 | A1* | 12/2022 | Nishibata .............. H02M 1/325 |
| 2022/0393633 | A1* | 12/2022 | Nishibata ................ H02M 1/32 |
| 2023/0129767 | A1* | 4/2023 | Nishibata .............. H02P 29/024 |

FOREIGN PATENT DOCUMENTS

| | | | | |
|---|---|---|---|---|
| JP | 2017-208911 A | | 11/2017 | |
| JP | 2018-182829 A | | 11/2018 | |
| WO | WO-2013046880 A1 | * | 4/2013 | .......... B60L 11/1803 |
| WO | WO-2019098217 A1 | * | 5/2019 | ............. G01R 15/04 |

\* cited by examiner

CONTROL CIRCUIT FOR POWER CONVERTER AND HAVING STARTUP DETERMINING UNIT

CROSS-REFERENCE TO RELATED APPLICATIONS

The present application is a continuation application of International Application No. PCT/JP2021/016164, filed on Apr. 21, 2021, which claims priority to Japanese Patent Application No. 2020-079442, filed on Apr. 28, 2020. The contents of these applications are incorporated herein by reference in their entirety.

BACKGROUND

Technical Field

The present disclosure relates to a control circuit for a power converter that has upper- and lower-arm switches that are connected to a winding of each phase of a rotating electric machine.

Related Art

For example, as this type of control circuit, a control circuit that configures an onboard system that includes a rotating electric machine that has multiple phases, and a power converter that has upper- and lower-arm switches that are electrically connected to phase windings of the rotating electric machine is known. The control circuit determines whether an abnormality has occurred in the onboard system. When determined that an abnormality has occurred, the control circuit performs short-circuit control in which the switch of either of the upper arm and the lower arm is turned on and the switch of the other arm is turned off.

SUMMARY

One aspect of the present disclosure provides a control circuit for a power converter that configures a system that is mounted to a vehicle and includes a rotating electric machine that has multiple phases and includes a rotor that is capable of transmitting power to and from a drive wheel, and the power converter that includes upper- and lower-arm switches that are electrically connected to phase windings of the rotating electric machine. The control circuit determines whether an abnormality has occurred in the system, determines whether the system has been started based on an output voltage of the insulating power supply, and performs short-circuit control to turn on an on-side switch that is either one of the upper- and lower-arm switches and to turn off an off-side switch that is the other of the upper- and lower-arm switches, in response to the system being determined to have been started, and the abnormality being determined to have occurred.

BRIEF DESCRIPTION OF THE DRAWINGS

In the accompanying drawings.

DESCRIPTION OF THE EMBODIMENTS

Figure 1:
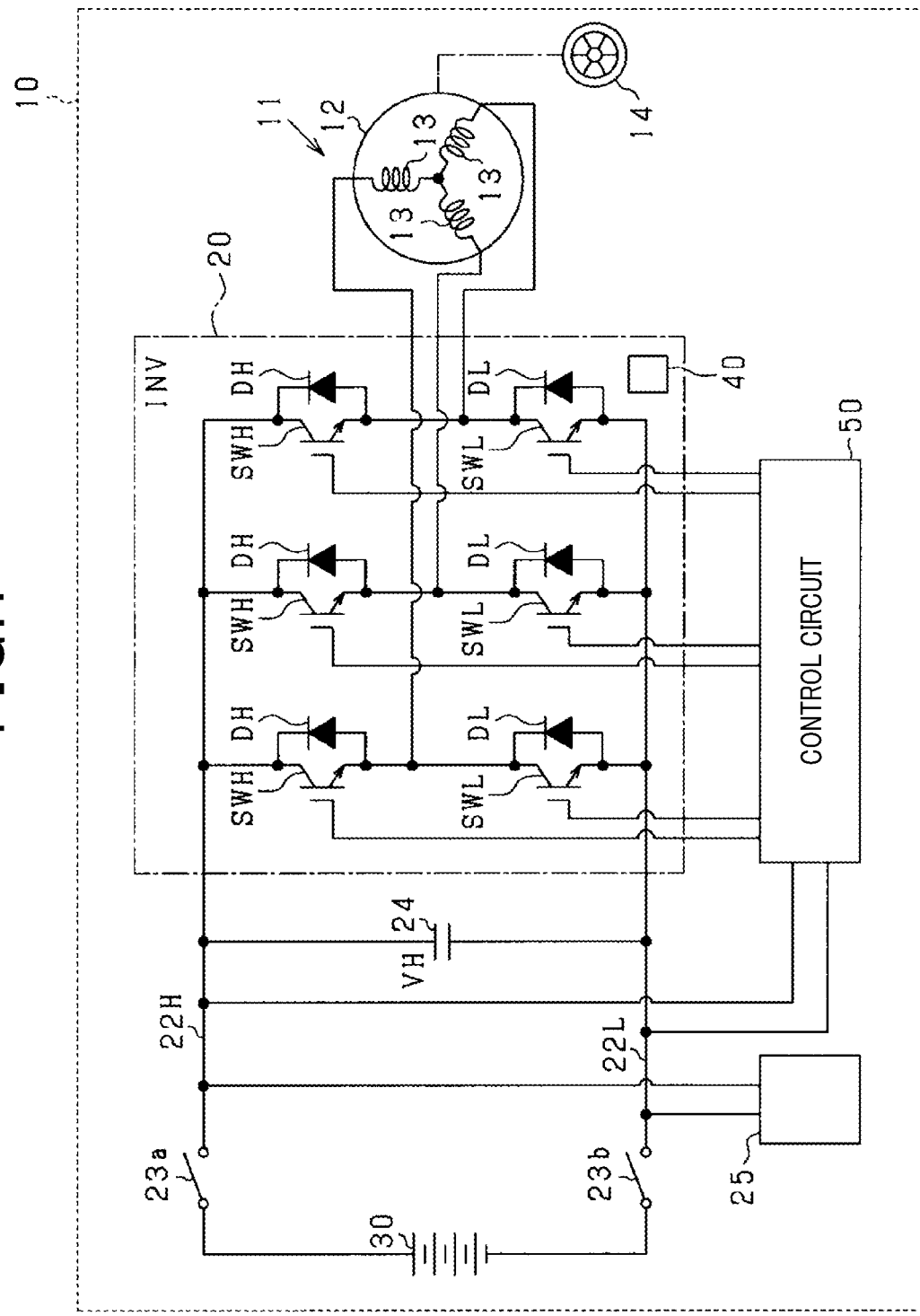
FIG. 1 is an overall configuration diagram illustrating a control system according to a first embodiment.

For example, as described in JP-A-2017-118815, as this type of control circuit, a control circuit that configures an onboard system that includes a rotating electric machine that has multiple phases, and a power converter that has upper- and lower-arm switches that are electrically connected to phase windings of the rotating electric machine is known. The control circuit determines whether an abnormality has occurred in the onboard system. When determined that an abnormality has occurred, the control circuit performs short-circuit control in which the switch of either of the upper arm and the lower arm is turned on and the switch of the other arm is turned off.

Here, a vehicle may be towed and a rotor of the rotating electric machine that is capable of transmitting power to and from a drive wheel may rotate. In this case, when the short-circuit control is performed, as a result of a counter-electromotive voltage that is generated in the winding as a result of rotation of the rotor, a circulating current flows to a closed circuit that includes the winding and the switch that is turned on, and the power converter may enter an overheated state.

To address this issue, for example, the power converter including a cooling apparatus and the cooling apparatus cooling the power converter can be considered. However, during towing of the vehicle, the cooling apparatus is ordinarily stopped. Therefore, even if the power converter includes the cooling apparatus, the power converter may not be prevented from entering the overheated state during towing of the vehicle.

It is thus desired to provide a control circuit for a power converter that is capable of preventing the power converter from entering an overheated state during towing of a vehicle.

A first exemplary embodiment of the present disclosure provides a control circuit for a power converter that configures an onboard system that includes a rotating electric machine that has multiple phases and includes a rotor that is capable of transmitting power to and from a drive wheel, and the power converter that includes upper- and lower-arm switches that are electrically connected to phase windings of the rotating electric machine. The control circuit includes: an abnormality determining unit that determines whether an abnormality has occurred in the onboard system; and a short-circuit control unit that performs short-circuit control to turn on an on-side switch that is either one of the upper- and lower-arm switches and to turn off an off-side switch that is the other of the upper- and lower-arm switches, in response to the abnormality being determined to have occurred in a state in which the onboard system has been started.

In the present disclosure, the short-circuit control is performed in response to an abnormality having occurred in the onboard system in a state in which the onboard system has been started. Therefore, the short-circuit control is not performed before the system has been started. Towing of a vehicle is ordinarily performed before the onboard system has been started. Therefore, as a result of the present disclosure, the short-circuit control can be prevented from being performed during towing of the vehicle. Consequently, the power converter can be prevented from entering an overheated state during the towing of the vehicle.

A second exemplary embodiment of the present disclosure provides a control circuit for a power converter that configures a system that is mounted to a vehicle and includes a rotating electric machine that has multiple phases and includes a rotor that is capable of transmitting power to and from a drive wheel, and the power converter that includes upper- and lower-arm switches that are electrically connected to phase windings of the rotating electric machine. The control circuit includes: an abnormality determining unit that determines whether an abnormality has occurred in the system; a startup determining unit that determines whether the system has been started based on an output voltage of the insulating power supply; and a short-circuit control unit that performs short-circuit control to turn on an on-side switch that is either one of the upper- and lower-arm switches and to turn off an off-side switch that is the other of the upper- and lower-arm switches, in response to the system being determined to have been started, and the abnormality being determined to have occurred.

In the control circuit, the short-circuit control unit and the startup determining unit are provided in the high-voltage region. The system includes a start switch that is operated by a user of the vehicle, instructs startup of the system by the start switch being turned on, and instructs stopping of the system by the start switch being turned off, and a low-voltage power supply that is provided in a low-voltage region that is electrically insulated from the high-voltage region. An insulating power supply is provided in the low-voltage region and the high-voltage region so as to straddle a boundary between the low-voltage region and the high-voltage region, receives electric power supplied from the low-voltage power supply, in response to the start switch being tuned on, and generates electric power that is supplied to respective gates of the on-side switch and the off-side switch. The startup determining unit determines that the system has been started, in response to an output voltage of the insulating power supply being determined to be equal to or greater than a predetermined voltage.

A third exemplary embodiment of the present disclosure provides a control circuit for a power converter that configures a system that is mounted to a vehicle and includes a rotating electric machine that has multiple phases and includes a rotor that is capable of transmitting power to and from a drive wheel, and the power converter that includes upper- and lower-arm switches that are electrically connected to phase windings of the rotating electric machine. The control circuit includes: an abnormality determining unit that determines whether an abnormality has occurred in the system; a startup determining unit that determines whether the system has been started based on an output voltage of the insulating power supply; a short-circuit control unit that performs short-circuit control to turn on an on-side switch that is either one of the upper- and lower-arm switches and to turn off an off-side switch that is the other of the upper- and lower-arm switches, in response to the system being determined to have been started, and the abnormality being determined to have occurred.

In the control circuit, the system includes a start switch that is operated by a user of the vehicle, instructs startup of the system by the start switch being turned on, and instructs stopping of the system by the start switch being turned off. The short-circuit control unit and the startup determining unit are provided in the high-voltage region. A startup signal output unit is provided in the low-voltage region and outputs a startup signal by the start switch being tuned on. A startup signal transmitting unit is provided in the high-voltage region and the low-voltage region such as to straddle a boundary between the high-voltage region and the low-voltage region, and transmits the startup signal that is outputted from the startup signal output unit to the high-voltage region, while electrically insulating between the high-voltage region and the low-voltage region. The startup determining unit determines that the system has been started, in response to the startup signal being determined to be received through the startup signal transmitting unit.

A fourth exemplary embodiment of the present disclosure provides a control circuit for a power converter that configures a system that is mounted to a vehicle and includes a rotating electric machine that has multiple phases and includes a rotor that is capable of transmitting power to and from a drive wheel, and the power converter that includes upper- and lower-arm switches that are electrically connected to phase windings of the rotating electric machine. The control circuit includes: an abnormality determining unit that determines whether an abnormality has occurred in the system; a startup determining unit that determines whether the system has been started based on an output voltage of the insulating power supply; a short-circuit control unit that performs short-circuit control to turn on an on-side switch that is either one of the upper- and lower-arm switches and to turn off an off-side switch that is the other of the upper- and lower-arm switches, in response to the system being determined to have been started, and the abnormality being determined to have occurred.

In the control circuit, the short-circuit control unit and the startup determining unit are provided in the high-voltage region. The system includes a start switch that is operated by a user of the vehicle, instructs startup of the system by the start switch being turned on, and instructs stopping of the system by the start switch being turned off, and a low-voltage power supply that is provided in a low-voltage region that is electrically insulated from the high-voltage region. An insulating power supply is provided in the low-voltage region and the high-voltage region so as to straddle a boundary between the low-voltage region and the high-voltage region, and in response to the start switch being tuned on, receives electric power supplied from the low-voltage power supply, and generates electric power that is supplied to respective gates of the on-side switch and the off-side switch. A startup signal output unit is provided in the low-voltage region and outputs a startup signal by the start switch being tuned on. A startup signal transmitting unit is provided in the high-voltage region and the low-voltage region so as to straddle a boundary between the high-voltage region and the low-voltage region, and transmits the startup signal that is outputted from the startup signal output unit to the high-voltage region, while electrically insulating between the high-voltage region and the low-voltage region. The startup determining unit determines that the system has been started, in response to an output voltage of the insulating power supply being determined to be equal to or greater than a predetermined voltage, and the startup signal being determined to be received through the startup signal transmitting unit.

The above-described exemplary embodiments of the present disclosure will be further clarified through the detailed description herebelow, with reference to the accompanying drawings.

First Embodiment

A first embodiment actualizing a control circuit of the present disclosure will hereinafter be described with reference to the drawings. The control circuit according to the present embodiment is applied to a three-phase inverter that serves as a power converter. According to the present embodiment, a control system that includes the control circuit and the inverter is mounted in a vehicle, such as an electric automobile or a hybrid car.

As shown in FIG. 1, a vehicle 10 includes a control system. The control system includes a rotating electric machine 11 and an inverter 20. The rotating electric machine 11 is a main onboard engine, and a rotor 12 thereof is capable of transferring power to and from a drive wheel 14. According to the present embodiment, a synchronous motor is used as the rotating electric machine 11. More specifically, a permanent-magnet synchronous motor is used.

The inverter 20 includes series-connection bodies composed of upper-arm switches SWH and lower-arm switches SWL for three phases. For each phase, a first end of a winding 13 of the rotating electric machine 11 is connected to a connection point between the upper- and lower-arm switches SWH and SWL. Second ends of the phase windings 13 are connected at a neutral point. The phase windings 13 are arranged such as to be shifted from each other by an electric angle of 120°. Here, according to the present embodiment, a voltage-controlled-type semiconductor switching element is used as each of the switches SWH and SWL. More specifically, an insulated-gate bipolar transistor (IGBT) is used. Upper- and lower-arm diodes DH and DL that are freewheeling diodes are connected in antiparallel to the upper- and lower-arm switches SWH and SWL.

A positive-electrode terminal of a high-voltage power supply 30 is connected to a collector that is a high-potential-side terminal of the upper-arm switch SWH by a high-potential-side electrical path 22H. A negative-electrode terminal of the high-voltage power supply 30 is connected to an emitter that is a low-potential-side terminal of the lower-arm switch SWL by a low-potential-side electrical path 22L. According to the present embodiment, the high-voltage power supply 30 is a secondary battery. An output voltage (rated voltage) of the high-voltage power supply 30 may be, for example, 100 V or higher.

A first interruption switch 23a is provided on the high-potential-side electrical path 22H, and a second interruption switch 23b is provided on the low-potential-side electrical path 22L. For example, the switches 23a and 23b may be relays or semiconductor switching elements. Here, the switches 23a and 23b may be driven by a control circuit 50 that is provided in the control system or may be driven by a control apparatus of a higher order than the control circuit 50.

The control system includes a smoothing capacitor 24. The smoothing capacitor 24 electrically connects a portion of the high-potential-side electrical path 22H that is further towards the inverter 20 side than the first interruption switch 23a and a portion of the low-potential-side electrical path 22L that is further towards the inverter 20 side than the second interruption switch 23a.

The control system includes an onboard electrical apparatus 25. For example, the electrical apparatus 25 may include at least either of an electric compressor and a direct current-to-direct current (DCDC) converter. The electric compressor configures an in-cabin air-conditioning apparatus and is driven by receiving electric power supplied from the high-voltage power supply 30 to circulate a coolant in an onboard refrigeration cycle. The DCDC converter steps down the output voltage of the high-voltage power supply 30 and supplies the stepped-down voltage to an onboard low-voltage load. The low-voltage load includes a low-voltage power supply 31 shown in FIG. 2. According to the present embodiment, the low-voltage power supply 31 is a secondary battery of which an output voltage (rated voltage) is a voltage (such as 12 V) that is lower than the output voltage (rated voltage) of the high-voltage power supply 30. For example, the low-voltage power supply 31 may be a lead storage battery.

The control system includes a cooling apparatus 40 for cooling the inverter 20. For example, the cooling apparatus 40 may be driven by receiving electric power supplied from the low-voltage power supply 31. The cooling apparatus 40 includes a cooling water path through which a cooling fluid (cooling water) that cools constituent components of the inverter 20, such as the upper- and lower-arm switches SWH and SWL, flow and a pump that circulates the cooling water through the cooling water path. Here, the cooling apparatus 40 is not limited to a liquid-cooled type. For example, the cooling apparatus 40 may be an air-cooled type that includes a fan.

Figure 2:
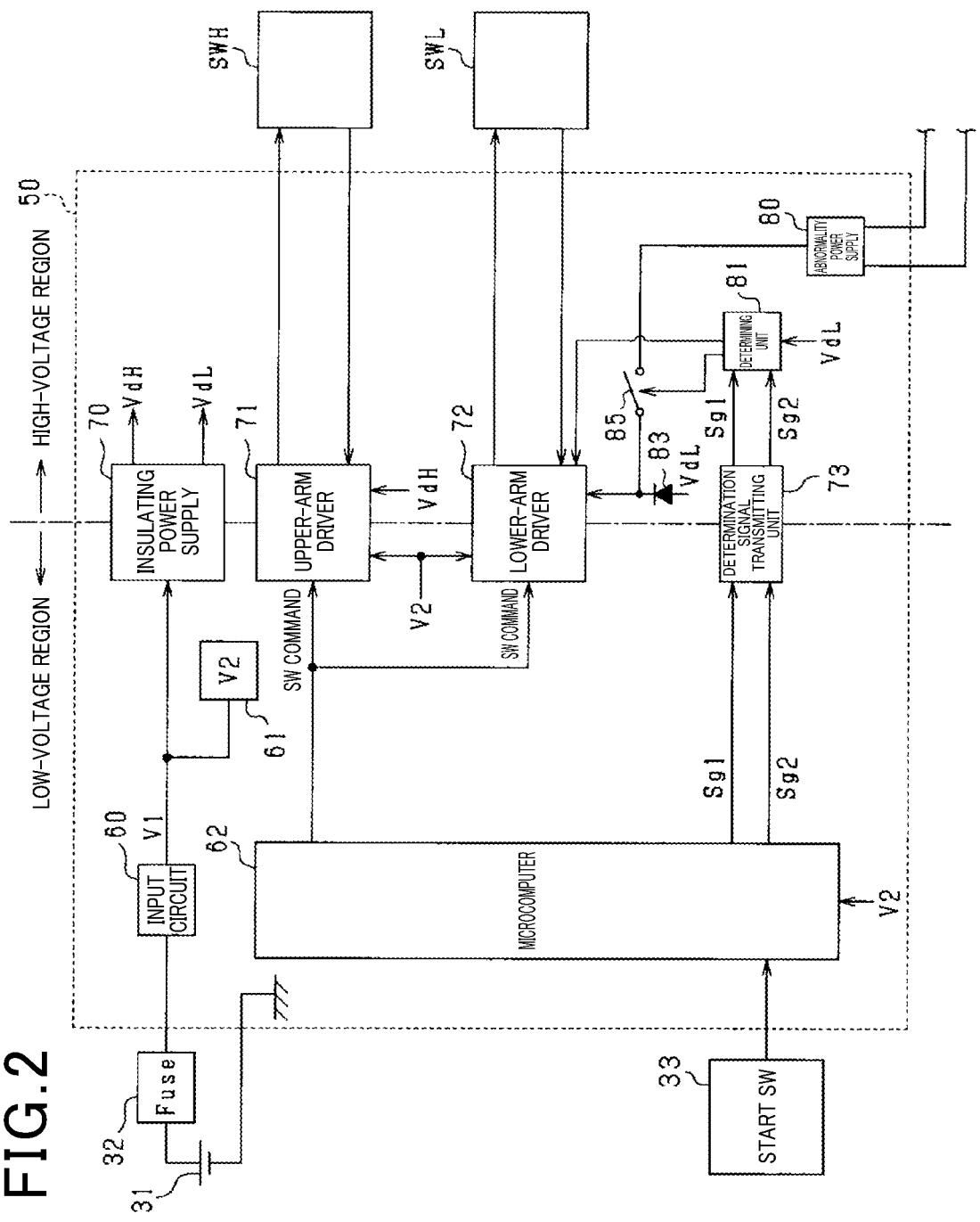
FIG. 2 is a diagram illustrating a control circuit and peripheral configurations thereof.

As shown in FIG. 2, the control system includes a start switch 33. For example, the start switch 33 may be an ignition switch or a push-type start switch, and be operated by a user of the vehicle 10. When the start switch 33 is turned on, the user instructs startup of the control system. Meanwhile, when the start switch 33 is turned off, the user instructs stopping of the control system.

Next, a configuration of the control circuit 50 will be described. The control circuit 50 includes an input circuit 60 and a power supply circuit 61. A positive-electrode terminal of the low-voltage power supply 31 is connected to the input circuit 60 with a fuse 32 therebetween. A ground that serves as a grounding portion is connected to a negative-electrode terminal of the low-voltage power supply 31. The power supply circuit 61 receives electric power supplied from the input circuit 60 and generates a second voltage V2. According to the present embodiment, the power supply circuit 61 steps down a first voltage V1 that is outputted by the input circuit 60 and generates the second voltage V2 (such as 5 V).

The control circuit 50 includes a microcomputer 62. The microcomputer 62 includes a central processing unit (CPU) and other peripheral circuits. The peripheral circuits include an input/output unit for exchanging signals with the outside. A signal that gives notification of the start switch 33 being turned on or off is inputted to the microcomputer 62. In addition, the microcomputer 62 generates a switching command for each of the switches SWH and SWL of the inverter 20 to control a controlled variable of the rotating electric machine 11 to a command value thereof. For example, the controlled variable may be torque. Here, for each phase, the microcomputer 62 generates the switching command such that the upper-arm switch SWH and the lower-arm switch SWL are alternately turned on. In addition to the microcomputer 62, the input circuit 60 and the power supply circuit 61 are provided in a low-voltage region of the control circuit 50.

The control circuit 50 includes an insulating power supply 70, an upper-arm driver 71, a lower-arm driver 72, and a determination signal transmitting unit 73. According to the present embodiment, the upper-arm driver 71 is individually provided in correspondence with each upper-arm switch SWH. The lower-arm driver 72 is individually provided in correspondence with each lower-arm switch SWL. Therefore, a total of six drivers 71 and 72 are provided.

The insulating power supply 70 and the upper- and lower-arm drivers 71 and 72 are provided in the low-voltage region and a high-voltage region of the control circuit 50 such as to straddle a boundary between the low-voltage region and the high-voltage region. Specifically, the insulating power supply 70 includes an upper-arm insulating power supply that is individually provided for each of the upper-arm drivers 71 of the three phases, and a lower-arm insulating power supply that is shared among the lower-arm drivers 72 of the three phases. Here, the lower-arm insulating power supply may be individually provided for each of the lower-arm drivers 72 of the three phases.

The insulating power supply 70 generates an upper-arm drive voltage VdH that is supplied to the upper-arm drivers 71 and a lower-arm drive voltage VdL that is supplied to the lower-arm drivers 72 based on the first voltage V1 that is supplied from the input circuit 60, and outputs the upper-arm drive voltage VdH and the lower-arm drive voltage VdL to the high-voltage region.

Next, the upper- and lower-arm drivers 72 will be described with reference to FIG. 3.

The upper-arm driver 71 includes an upper-arm drive unit 71a and an upper-arm insulating transmitting unit 71b. The upper-arm drive unit 71a is provided in the high-voltage region. The upper-arm insulating transmitting unit 71b is provided in the low-voltage region and the high-voltage region such as to straddle the boundary between the low-voltage region and the high-voltage region. The upper-arm insulating transmitting unit 71b transmits the switching command that is outputted from the microcomputer 62 to the upper-arm drive unit 71a while electrically insulating between the low-voltage region and the high-voltage region. For example, the upper-arm insulating transmitting unit 71b may be a photocoupler or a magnetic coupler.

Of the upper-arm driver 71, the configuration on the high-voltage region side of the upper-arm drive unit 71a and the upper-arm insulating transmitting unit 71b and the like are configured to be capable of operating by being supplied the upper-arm drive voltage VdH of the insulating power supply 70. Of the upper-arm driver 71, the configuration on the low-voltage region side of the upper-arm insulating transmitting unit 71b and the like are configured to be capable of operating by being supplied the second voltage V2 of the power supply circuit 61.

The upper-arm drive unit 71a supplies a charge current to a gate of the upper-arm switch SWH when the inputted switching command that is inputted through the upper-arm insulating transmitting unit 71b is an on-command. As a result, a gate voltage of the upper-arm switch SWH is equal to or greater than a threshold voltage Vth, and the upper-arm switch SWH is turned on. Meanwhile, when the inputted switching command is an off-command, the upper-arm drive unit 71a sends a discharge current from the gate of the upper-arm switch SWH to an emitter side. As a result, the gate voltage of the upper-arm switch SWH is less than the threshold voltage Vth, and the upper-arm switch SWH is turned off.

The lower-arm driver 72 includes a lower-arm drive unit 72a and a lower-arm insulating transmitting unit 72b. According to the present embodiment, configurations of the drivers 71 and 72 are basically identical. Therefore, hereafter, a detailed description of the lower-arm driver 72 is omitted as appropriate.

Of the lower-arm driver 72, a configuration on the high-voltage region side of the lower-arm drive unit 72a and the lower-arm insulating transmitting unit 72b and the like are configured to be capable of operating by being supplied the lower-arm drive voltage VdL of the insulating power supply 70. Of the lower-arm driver 72, a configuration on the low-voltage region side of the lower-arm insulating transmitting unit 72b and the like are configured to be capable of operating by being supplied the second voltage V2 of the power supply circuit 61.

The lower-arm drive unit 72a supplies a charge current to a gate of the lower-arm switch SWL when the inputted switching command that is inputted through the lower-arm insulating transmitting unit 72b is the on-command. As a result, a gate voltage of the lower-arm switch SWL is equal to or greater than the threshold voltage Vth, and the lower-arm switch SWL is turned on. Meanwhile, when the inputted switching command is the off-command, the lower-arm drive unit 72a sends a discharge current from the gate of the lower-arm switch SWL to the emitter side. As a result, the gate voltage of the lower-arm switch SWL is less than the threshold voltage Vth, and the lower-arm switch SWL is turned off.

Figure 3:
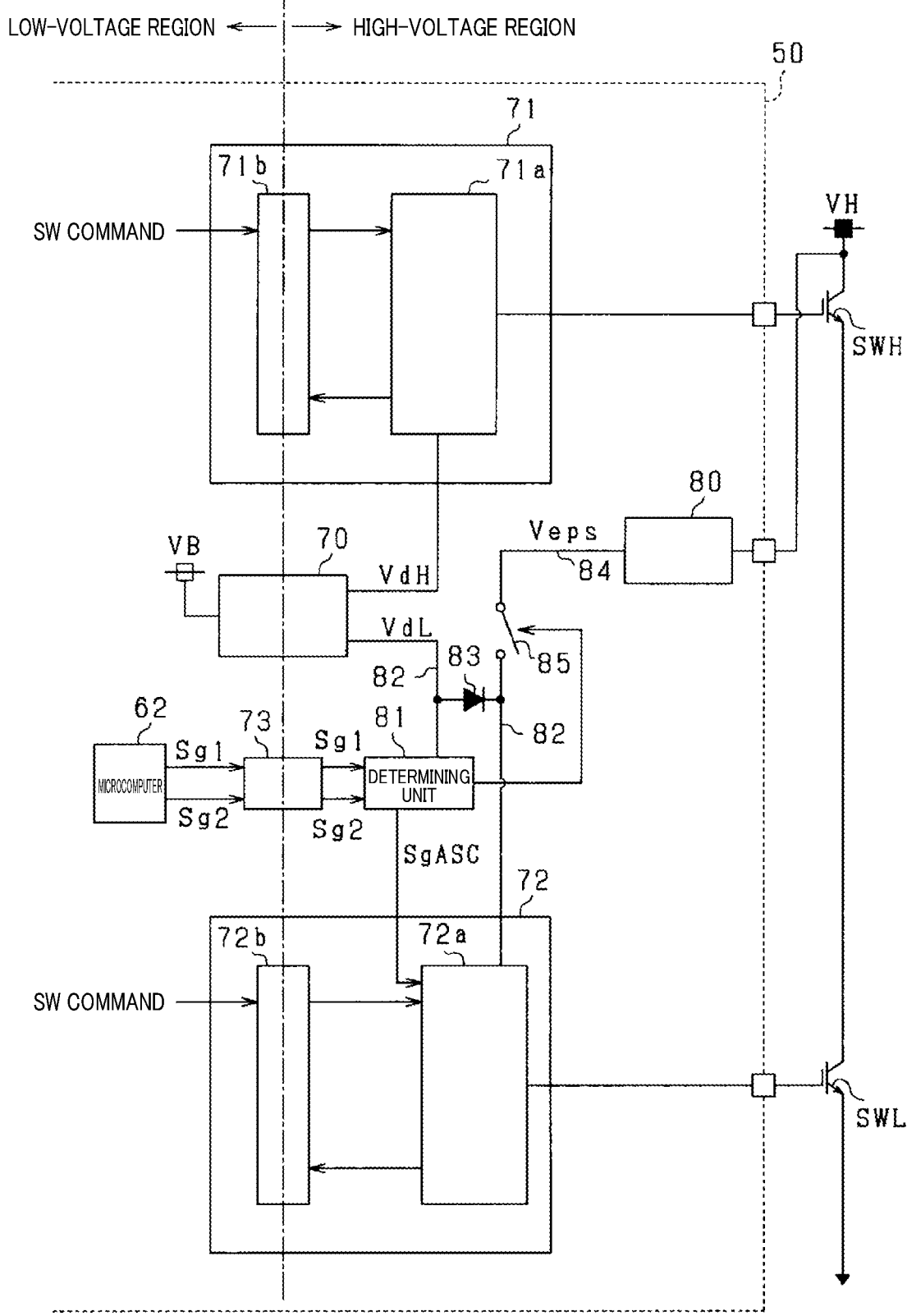
FIG. 3 is a diagram illustrating upper- and lower-arm drive units and peripheral configurations thereof.

As shown in FIG. 2 and FIG. 3, the control circuit 50 includes a determination signal transmitting unit 73 and a determining unit 81. The determination signal transmitting unit 73 is provided in the low-voltage region and the high-voltage region such as to straddle the boundary between the low-voltage region and the high-voltage region. The determination signal transmitting unit 73 transmits a startup signal Sg1 and an abnormality signal Sg2 that are outputted from the microcomputer 62 to the determining unit 81, while electrically insulating between the low-voltage region and the high-voltage region. According to the present embodiment, the microcomputer 62 corresponds to a "startup signal output unit." In addition, the determination signal transmitting unit 73 corresponds to a "startup signal transmitting unit" and an "abnormality signal transmitting unit." For example, the determination signal transmitting unit 73 may be a photocoupler or a magnetic coupler. Here, separate determination signal transmitting units 73 may be provided to transmit the startup signal Sg1 and the abnormality signal Sg2. Alternatively, the determination signal transmitting unit 73 may be provided as a shared transmitting unit for the startup signal Sg1 and the abnormality signal Sg2.

When the user instructs startup of the control system by the start switch 33 being turned on, the microcomputer 62 is subsequently turned on. In this case, according to the present embodiment, a logic of the startup signal Sg1 that is outputted from the microcomputer 62 is inverted from L to H. Meanwhile, when the user instructs stopping of the control system by the start switch 33 being turned off, the microcomputer 62 is subsequently turned off. In this case, the logic of the startup signal Sg1 that is outputted from the microcomputer 62 is inverted from H to L.

The abnormality signal Sg2 is a signal that indicates presence/absence of an abnormality in a constituent component of the control system, such as the control circuit 50. When determined that an abnormality has not occurred in the control system, the microcomputer 62 sets a logic of the abnormality signal to L. Meanwhile, when determined that an abnormality has occurred in the control system, the microcomputer 62 inverts the logic of the abnormality signal Sg2 from L to H.

Here, the abnormality in the control system includes an abnormality in which electric power cannot be supplied from the low-voltage power supply 31 to the control circuit 50 and an abnormality within the control circuit. Here, the abnormality within the control circuit includes an abnormality in the microcomputer 62, an abnormality in the power supply circuit 61, an abnormality in which the switching command cannot be normally transmitted from the microcomputer 62 to the upper- and lower-arm drivers 71 and 72, and an abnormality in which a voltage cannot be outputted from the insulating power supply 70. The abnormality in which a voltage cannot be outputted from the insulating power supply 70 includes an abnormality in the insulating power supply 70 and an abnormality in which electric power cannot be supplied from the low-voltage power supply 31 to the insulating power supply 70. Here, for example, the abnormality in which electric power cannot be supplied from the low-voltage power supply 31 to the insulating power supply 70 may occur as a result of an electrical path from the low-voltage power supply 31 to the insulating power supply 70, such as the input circuit 60, being disconnected. In addition, when described using the lower-arm driver 72 as an example, the abnormality in which the switching command cannot be normally transmitted includes an abnormality in which a signal path from the microcomputer 62 to the lower-arm insulating transmitting unit 72b is disconnected. Here, for example, the above-described abnormalities may occur as a result of collision of the vehicle 10.

The control circuit 50 includes an abnormality power supply 80 in the high-voltage region thereof. The abnormality power supply 80 generates an abnormality drive voltage Veps by being supplied an output voltage VH of the smoothing capacitor 24. Various power supplies, such as a switching power supply and a series power supply, are used as the abnormality power supply 80. Here, according to the present embodiment, the abnormality power supply 80 corresponds to a "drive power supply."

The control circuit 50 includes a normal power supply path 82, a normal diode 83, an abnormality power supply path 84, and an abnormality switch 85 in the high-voltage region thereof. The normal power supply path 82 connects an output side of the insulating power supply 70 and the lower-arm drive unit 72a, and supplies the lower-arm drive voltage VdL to the lower-arm drive unit 72a. The normal diode 83 is provided in an intermediate position on the normal power supply path 82 in a state in which the anode is connected to the output side of the insulating power supply 70.

A portion of the normal power supply path 82 that is further towards the lower-arm drive unit 72a side than the normal diode 83 and the abnormality power supply 80 are connected by the abnormality power supply path 84. The abnormality switch 85 is provided on the abnormality power supply path 84. The abnormality power supply path 84 supplies the abnormality drive voltage Veps to the lower-arm drive unit 72a.

The lower-arm drive voltage VdL of the insulating power supply 70 is supplied to the determining unit 81 through the normal power supply path 82. In addition, the startup signal Sg1 and the abnormality signal Sg2 are inputted to the determining unit 81 through the determination signal transmitting unit 73. When performing three-phase short-circuit control (hereafter, active short circuit [ASC] control) in which the upper-arm switches SWH of the three phases are turned off and the lower-arm switches SWL of the three phases are turned on, the determining unit 81 switches the abnormality switch 85 to on. As a result, electric power is supplied to the lower-arm drive unit 72a. In addition, the determining unit 81 outputs an ASC execution command SgASC to the lower-arm drive unit 72a. The lower-arm switch SWL is turned on by the lower-arm drive unit 72a.

A process for determining whether ASC control may be performed will be described with reference to FIG. 4. For example, the determining unit 81 may repeatedly perform this process at a predetermined control cycle.

At step S10, the determining unit 81 determines whether at least either of a first condition that the logic of the startup signal Sg1 is H and a second condition that the lower-arm drive voltage VdL is equal to or greater than a determination voltage Vs is met. Here, the determination voltage Vs may be set to a value that is greater than 0.

When determined that neither of the first condition and the second condition is met at step S20, the determining unit 81 proceeds to step S11 and determines that the state is an ASC control prohibited state.

When determined that at least either of the first condition and the second condition is met at step S20, the determining unit 81 proceeds to step S12 and determines that the state is an ASC control permitted state.

A process for determining whether to perform ASC control will be described with reference to FIG. 5. For example, the determining unit 81 may repeatedly perform this process at a predetermined control cycle.

At step S20, the determining unit 81 determines whether the state is the ASC control permitted state. When a negative determination is made at step S20, the determining unit 81 determines that the state is the ASC control prohibited state and proceeds to step S21. At step S21, the determining unit 81 does not perform ASC control.

Meanwhile, when an affirmative determination is made at step S20, the determining unit 81 proceeds to step S22 and determines whether at least either of a third condition that the logic of the abnormality signal Sg2 is H and a fourth condition that the lower-arm drive voltage VdL is less than a predetermined voltage Vp is met. Here, the predetermined voltage Vp is set to a value that enables determination that a sufficient period until the upper-arm switch SWH is turned off has elapsed. For example, the predetermined voltage Vp may be set to a value that is identical to the above-described threshold voltage Vth or a value that is less than the threshold voltage Vth.

When determined that neither of the third condition and the fourth condition is met at step S22, the determining unit 81 proceeds to step S21. Meanwhile, when determined that at least either of the third condition and the fourth condition is met at step S20, the determining unit 81 proceeds to step S23 and performs ASC control. Specifically, the abnormality switch 85 is switched to on and the ASC execution command SgASC is outputted to the lower-arm drive unit 72a. Here, when the process at step S23 is performed, the switching command that is outputted from the microcomputer 62 to the upper-arm drivers 71 of the three phases may be the off-command.

Here, according to the present embodiment, the determining unit 81 corresponds to a "short-circuit control unit," a "startup determining unit," and an "abnormality determining unit."

Figure 6:
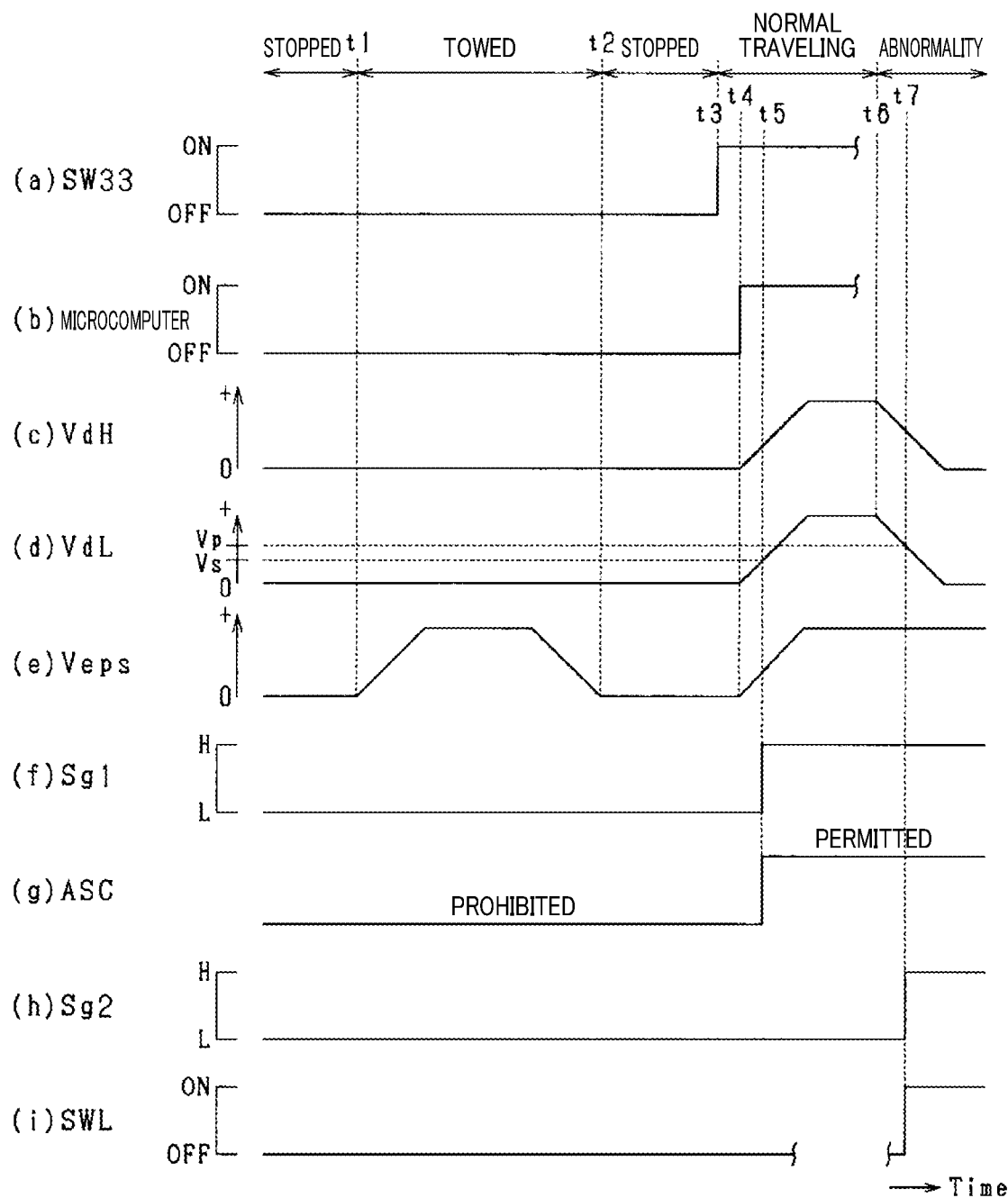
FIG. 6 is a timing chart illustrating an example of ASC control.

Control according to the present embodiment will be described with reference to FIG. 6. FIG. 6(a) shows an operating state of the start switch 33. FIG. 6(b) shows an operation state of the microcomputer 62. FIG. 6(c) shows transitions in the upper-arm drive voltage VdH. FIG. 6(d) shows transitions in the lower-arm drive voltage VdL. FIG. 6(e) shows transitions in the abnormality drive voltage Veps. FIG. 6(f) shows transitions in the startup signal Sg1. FIG. 6(g) shows the ASC control permitted/prohibited state. FIG. 6(h) shows transitions in the abnormality signal Sg2. FIG. 6(i) shows a drive state of the lower-arm switch SWL.

Before time t1, the start switch 33 is turned off and the vehicle 10 is stopped. At time t1, in the state in which the start switch 33 is turned off, towing of the vehicle 10 is started. As a result of the towing of the vehicle 10, the rotor 12 that configures the rotating electric machine 11 rotates and a counter-electromotive voltage is generated in the winding 13. When the first and second interruption switches 23a and 23b are turned off in the state in which the start switch 33 is turned off, the smoothing capacitor 24 is charged by the counter-electromotive voltage. The output voltage VH of the smoothing capacitor 24 is supplied to the abnormality power supply 80. Therefore, the abnormality drive voltage Veps increases.

During the towing of the vehicle 10, because the start switch 33 is turned off, the lower-arm drive voltage VdL is 0 V that is lower than the determination voltage Vs. In addition, the logic of the startup signal Sg1 that is inputted to the determining unit 81 is L. Therefore, the state is the ASC control prohibited state, and ASC control is not performed during towing of the vehicle 10.

At time t2, the towing of the vehicle 10 is completed, and the vehicle 10 is in a stopped state. At subsequent time t3, the start switch 33 is turned on. As a result, power supply from the low-voltage power supply 31 to the power supply circuit 61 is started, and power supply from the power supply circuit 61 to the microcomputer 62 is started. At subsequent time t4, the microcomputer 62 is turned on. In addition, power supply from the low-voltage power supply 31 to the insulating power supply 70 is also started. The upper- and lower-arm drive voltages VdH and VdL start to increase. Then, at time t5, the lower-arm drive voltage VdL reaches the determination voltage Vs. For example, when the determination voltage Vs is set to a value that is equal to or greater than the threshold voltage Vth, the lower-arm drive unit 72a can turn on the lower-arm switch SWL using the lower-arm drive voltage VdL when ASC control is performed. Because at least either of the first condition and the second condition is met at time t5, the determining unit 81 determines that the control system has been started and switches the ASC control prohibited state to the permitted state. Here, in the example shown in FIG. 6, a first timing at which the logic of the startup signal Sg1 becomes H and a second timing at which the lower-arm drive voltage VdL reaches the determination voltage Vs are a same timing. However, this is not limited thereto.

At time t6, when an abnormality in which electric power can no longer be supplied from the low-voltage power supply 31 to the control circuit 50 occurs, the insulating power supply 70 is stopped, and the upper- and lower-arm drive voltages VdH and VdL start to decrease. Subsequently, at time t7, the lower-arm drive voltage VdL falls below the predetermined voltage Vp. Here, in the example shown in FIG. 6, at time t7, the logic of the abnormality signal Sg2 outputted from the determination signal transmitting unit 73 is inverted to H.

After the detected lower-arm drive voltage VdL starts to decrease, the determining unit 81 waits until the upper-arm drive voltage VdH falls below the threshold voltage Vth, and determines that an abnormality has occurred in the control system. As a result, the determining unit 81 switches the abnormality switch 85 to on and outputs the ASC execution command SgASC to the lower-arm drive unit 72a. As a result, ASC control is performed by the lower-arm switch SWL being turned on. Here, according to the present embodiment, the lower-arm switch SWL corresponds to an "on-side switch."

When the lower-arm drive voltage VdL falls below the predetermined voltage Vp, the upper-arm switches SWH of the three phases cannot be turned on by the upper-arm drive units 71a, and the upper-arm switches SWH of the three phases are turned off. Therefore, an upper- and lower-arm short circuit can be prevented from occurring. Here, according to the present embodiment, the upper-arm switch SWH corresponds to an "off-side switch."

Figure 7:
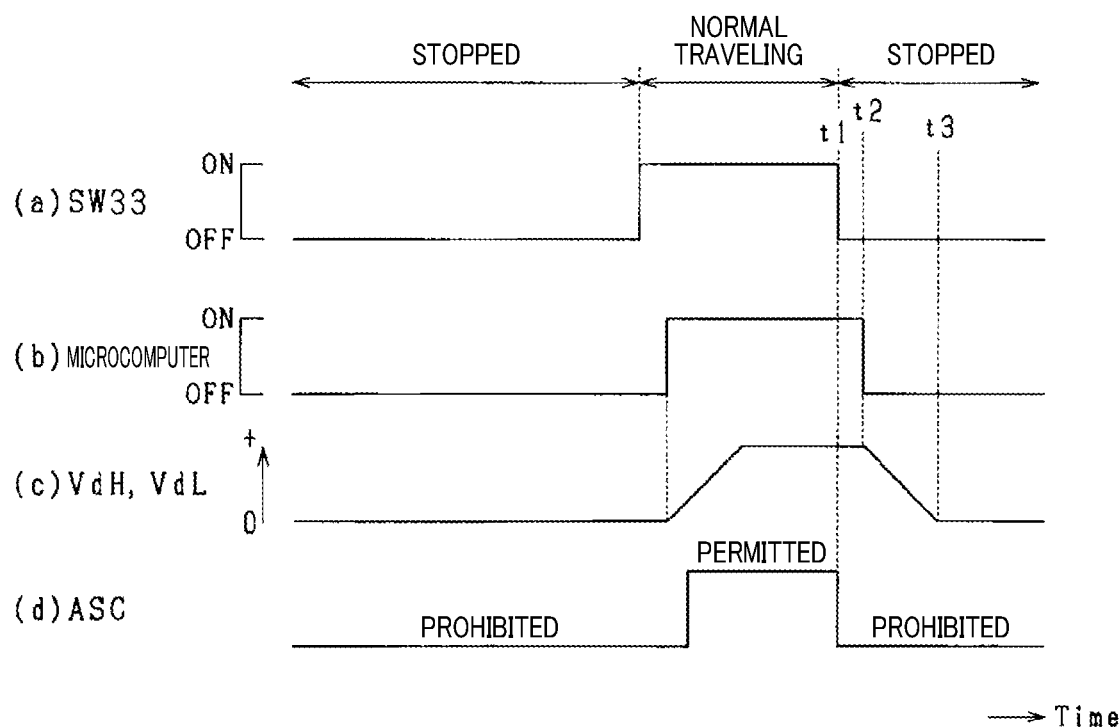
FIG. 7 is a timing chart illustrating an example of control during vehicle stop.

Here, even when the start switch 33 is turned off, the state is the ASC control prohibited state. FIG. 7(a) shows the operating state of the start switch 33. FIG. 7(b) shows the operation state of the microcomputer 62. FIG. 7(c) shows transitions in the upper- and lower-arm drive voltages VdH and VdL. FIG. 7(d) shows the ASC control permitted/prohibited state.

At time t1, when the start switch 33 is turned off, the ASC control permitted state is switched to the prohibited state. Subsequently, at time t2, the microcomputer 62 is turned off, and the upper- and lower-arm drive voltages VdH and VdL start to decrease. Furthermore, subsequently, at time t3, the upper- and lower-arm drive voltages VdH and VdL become 0 V. Because the logic of the startup signal Sg1 becomes L when the start switch 33 is turned off, the state becomes the ASC control prohibited state. Therefore, ASC control can be prevented from being performed during the towing of the vehicle 10.

Figure 8:
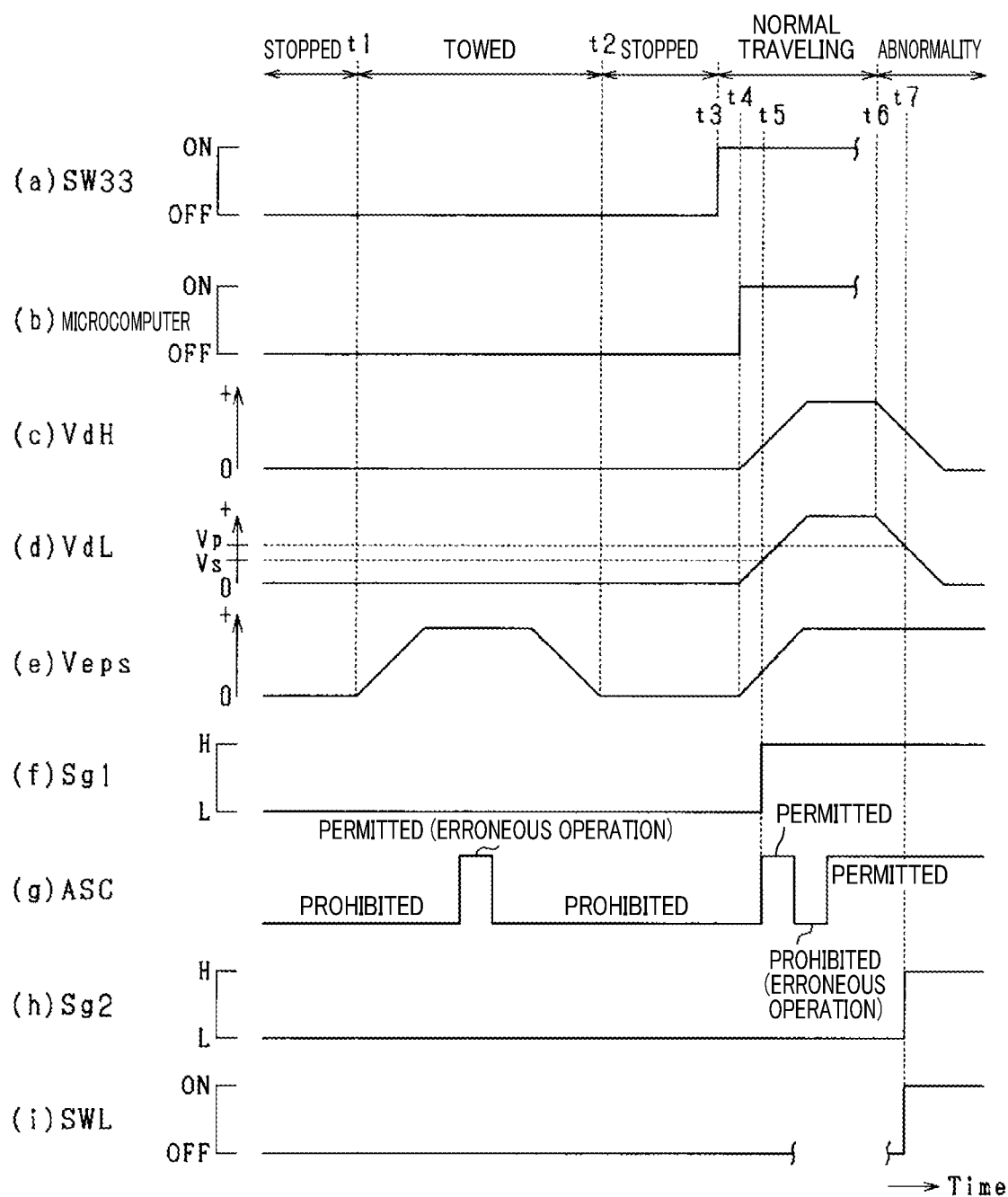
FIG. 8 is a timing chart illustrating an example of ASC control.

The processes in FIG. 4 and FIG. 5 will be further described with reference to FIG. 8. FIGS. 8(a) to (i) correspond to FIGS. 6(a) to (i) above. In addition, time t1, t2, . . . t7 in FIG. 8 correspond to time t1, t2, . . . t7 in FIG. 6. As shown at time t1 to t2 in FIG. 8(g), during the towing of the vehicle 10, the state may switch to the ASC control permitted state regardless of the state actually being the ASC control prohibited state, as a result of erroneous operation of the control circuit 50 attributed to a factor of some kind. In this case as well, the determining unit 81 can switch the erroneously set ASC control permitted state to the prohibited state by performing the process shown in FIG. 4 at the predetermined control cycle.

As shown at time t5 to t6 in FIG. 8(g), during normal traveling of the vehicle 10, the state may switch to the ASC control prohibited state regardless of the state actually being the ASC control permitted state, as a result of erroneous operation of the control circuit 50 attributed to a factor of some kind. In this case as well, the determining unit 81 can switch the erroneously set ASC control prohibited state to the permitted state by performing the process shown in FIG. 4 at the predetermined control cycle.

According to the present embodiment described in detail above, following effects can be achieved.

The determining unit 81 determines that the control system has been started and switches the ASC control prohibited state to the permitted state. Then, when the permitted state is set, the determining unit 81 performs ASC control when determined that an abnormality has occurred in the control system. Towing of the vehicle 10 is ordinarily performed before startup of the control system. Before startup of the control system, the start switch 33 is turned off and the lower-arm drive voltage VdL is less than the determination voltage Vs. Therefore, before startup of the control system, the state is the ASC control prohibited state. As a result, ASC control can be prevented from being performed during the towing of the vehicle 10. Consequently, the inverter 20 can be prevented from entering an overheated state during the towing of the vehicle 10.

After stopping of the insulating power supply 70, when the lower-arm switch SWL is turned on by ASC control in a state in which the voltage that is supplied from the insulating power supply 70 to the upper-arm switch SWH is not sufficiently decreased, an upper- and lower-arm short circuit may occur.

In this regard, according to the present embodiment, the determining unit 81 determines that an abnormality has occurred when the lower-arm drive voltage VdL falls below the predetermined voltage Vp. Therefore, ASC control is performed in a state in which the gate voltage of the upper-arm switch SWH is sufficiently decreased. As a result, the lower-arm switch SWL is not turned on when the upper-arm switch SWH is turned on. Consequently, the upper- and lower-arm short circuit can be prevented from occurring in accompaniment with execution of ASC control.

The determining unit 81 periodically performs determination regarding whether the state is the ASC control permitted state or the prohibited state. As a result, when the state is the permitted state before startup of the control system as a result of a factor of some kind, regardless of the state actually being the prohibited state, the state can be determined to be the prohibited state at a next determination. Meanwhile, when the state is the prohibited state before startup of the control system as a result of a factor of some kind, regardless of the state actually being the permitted state, the state can be determined to be the permitted state at the next determination. Consequently, erroneous operation in which ASC control is performed before startup of the control system can be prevented. In addition, non-operation, in which ASC control is not performed even when an abnormality occurs after startup of the control system, can be prevented.

<Modifications According to the First Embodiment>

Figure 4:
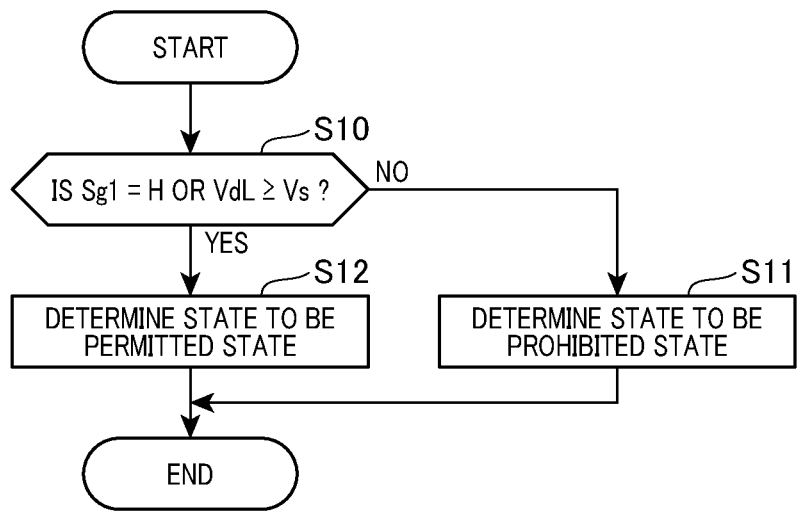
FIG. 4 is a flowchart illustrating processing steps for determining an ASC control permitted/prohibited state.

The process at step S10 in FIG. 4 may be a process for determining whether both of the first condition that the logic of the startup signal Sg1 is H and the second condition that the lower-arm drive voltage VdL is equal to or greater than the determination voltage Vs are met. As a result, determination accuracy regarding whether the control system has been started can be improved.

At step S10 in FIG. 4, either of the startup signal Sg1 and the lower-arm drive voltage VdL may be used. For example, when the lower-arm drive voltage VdL is used, the process at step S10 may be a process for determining whether the second condition is met. In this case, the determination signal transmitting unit 73 for transmitting the startup signal Sg1 may not be provided in the control circuit 50.

Figure 5:
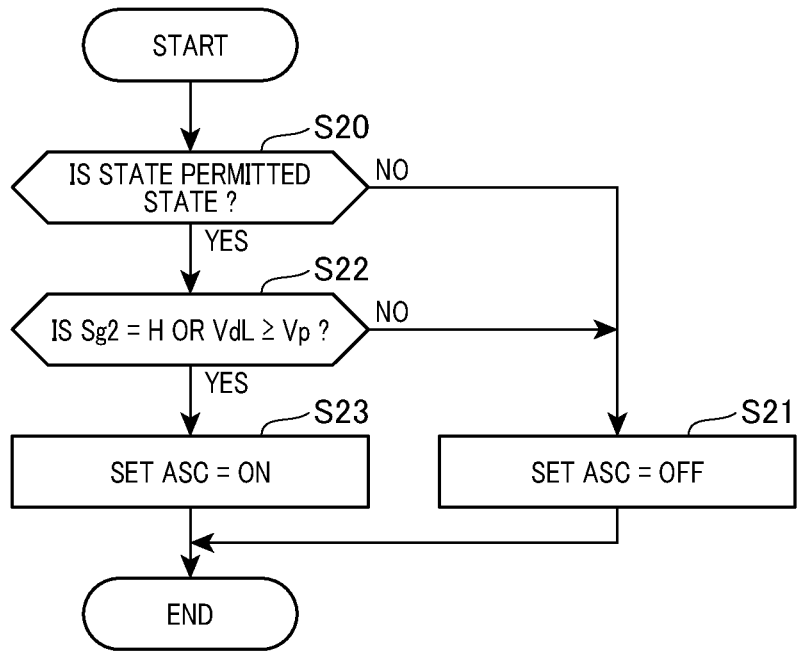
FIG. 5 is a flowchart illustrating processing steps for determining execution of ASC control.

The process at step S22 in FIG. 5 may be a process for determining whether both of the third condition that the logic of the abnormality signal Sg2 is H and the fourth condition that the lower-arm drive voltage VdL is less than the predetermined voltage Vp are met.

At step S22 in FIG. 5, either of the abnormality signal Sg2 and the lower-arm drive voltage VdL may be used. For example, when the lower-arm drive voltage VdL is used, the process at step S22 may be a process for determining whether the fourth condition is met. In this case, the determination signal transmitting unit 73 for transmitting the abnormality signal Sg2 may not be provided in the control circuit 50.

As ASC control, control to turn on the upper-arm switches SWH of the three phases and to turn off the lower-arm switches SWL of the three phases may be performed. In this case, the abnormality power supply 80 may be separately provided for each of the upper-arm drive units 71a of the three phases.

The determining unit 81 may determine an abnormality in the control system based on the upper-arm drive voltage VdH instead of the lower-arm drive voltage VdL. In this case, the determining unit 81 may acquire information on the upper-arm drive voltage VdH through the insulating transmitting unit.

The predetermined voltage may be set to a value that greater than the threshold voltage Vth and less than the first voltage V1.

Second Embodiment

Figure 9:
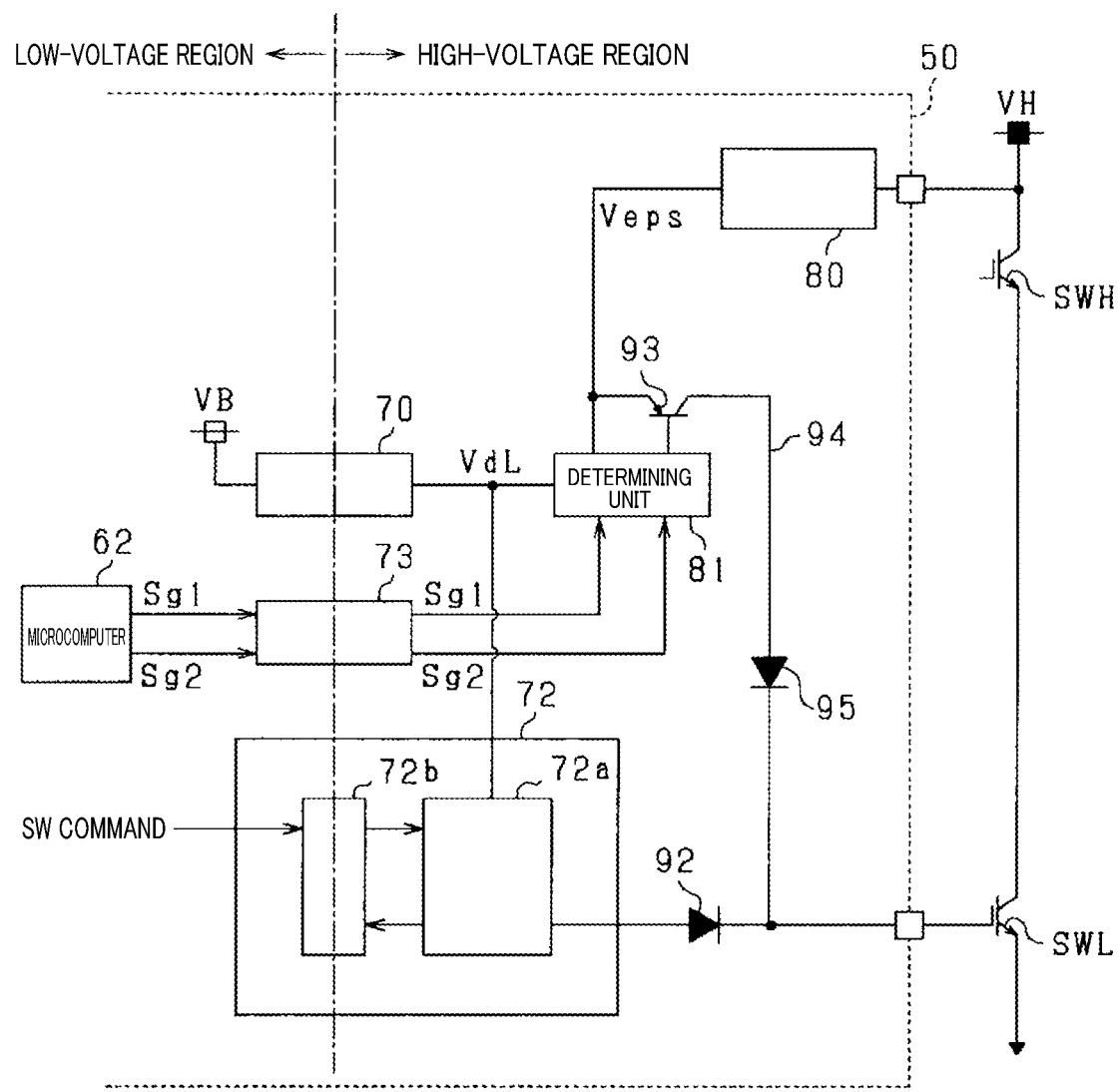
FIG. 9 is a diagram illustrating upper- and lower-arm drive units and peripheral configuration thereof according to a second embodiment.

A second embodiment will be described below, mainly focusing on differences with the first embodiment. According to the present embodiment, as shown in FIG. 9, a configuration of the high-voltage region of the control circuit 50 is partially modified to directly supply a voltage to the gate of the lower-arm switch SWL. Here, in FIG. 9, the configurations shown in foregoing FIG. 3 are given the same reference numbers for convenience.

In the high-voltage region of the control circuit 50, a first regulating diode 92 is provided on a gate charging path that connects the lower-arm drive unit 72a and the gate of the lower-arm switch SWL. The first regulating diode 92 is provided in a state in which an anode is connected to the lower-arm drive unit 72a side. Here, in FIG. 9, illustration of a gate discharging path of the lower-arm switch SWL is omitted.

The control circuit 50 includes an abnormality charging switch 93, an abnormality charging path 94, and a second regulating diode 95. The abnormality charging switch 93 connects the abnormality power supply 80 and the abnormality charging path 94. The gate of the lower-arm switch SWL is connected to the abnormality charging path 94. The second regulating diode 95 is provided on the abnormality charging path 94 in a state in which an anode is connected to the abnormality charging switch 93 side.

The determining unit 81 switches the abnormality charging switch 93 to on when determined that at least either of the third condition that the logic of the abnormality signal Sg2 is H and the fourth condition that the lower-arm drive voltage VdL is less than the predetermined voltage Vp is met. As a result, the abnormality drive voltage Veps starts to be directly supplied from the abnormality power supply 80 to the gate of each lower-arm switch SWL. Consequently, ASC control is performed.

According to the present embodiment described above, effects similar to those according to the first embodiment can be achieved.

Third Embodiment

Figure 10:
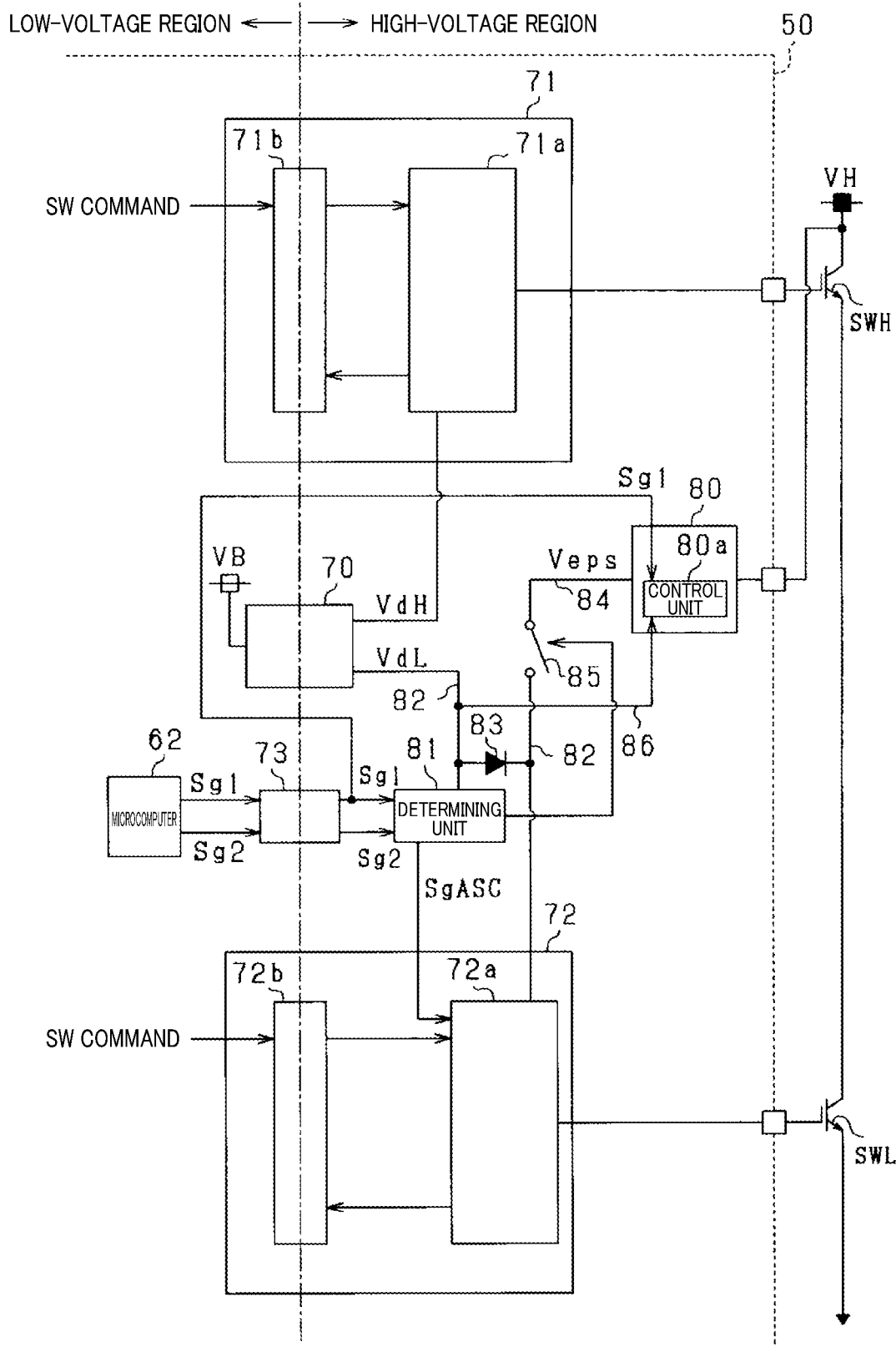
FIG. 10 is a diagram illustrating upper- and lower-arm drive units and peripheral configurations thereof according to a third embodiment.

A third embodiment will be described below, mainly focusing on differences with the first embodiment. According to the present embodiment, the configuration of the high-voltage region of the control circuit 50 is partially modified as shown in FIG. 10, to add a configuration for controlling startup of the abnormality power supply 80. Here, in FIG. 10, the configurations shown in foregoing FIG. 3 are given the same reference numbers for convenience.

The abnormality power supply 80 includes a control unit 80a. The abnormality power supply path 84 is connected to an output side of the abnormality power supply 80. The control unit 80a controls the abnormality drive voltage Veps that is outputted from the abnormality power supply 80 to a target voltage. Here, according to the present embodiment, the control unit 80a corresponds to a "power supply control unit."

The startup signal Sg1 that is outputted from the microcomputer 62 is inputted to the control unit 80a through the determination signal transmitting unit 73.

The control circuit 50 includes a startup determination path 86. A portion of the normal power supply path 82 that is further towards the insulating power supply 70 side than the normal diode 83 and the control unit 80a are connected by the startup determination path 86. The lower-arm drive voltage VdL of the insulating power supply 70 is inputted to the control unit 80a through the startup determination path 86.

The control unit 80a determines whether the control system has been started by a process similar to the process in foregoing FIG. 4. When determined that the control system is started, the control unit 80a starts the abnormality power supply 80. Specifically, the control unit 80a determines whether at least either of the first condition that the logic of the inputted startup signal Sg1 is H and the second condition that the inputted lower-arm drive voltage VdL is equal to or greater than the determination voltage Vs is met. When determined that neither of the first condition and the second condition is met, the control unit 80a determines that the control system has not been started and also determines that the state is the ASC control prohibited state. Meanwhile, when determined that at least either of the first condition and the second condition is met, the control unit 80a determines that the control system has been started and also determines that the state is the ASC control permitted state.

Figure 11:
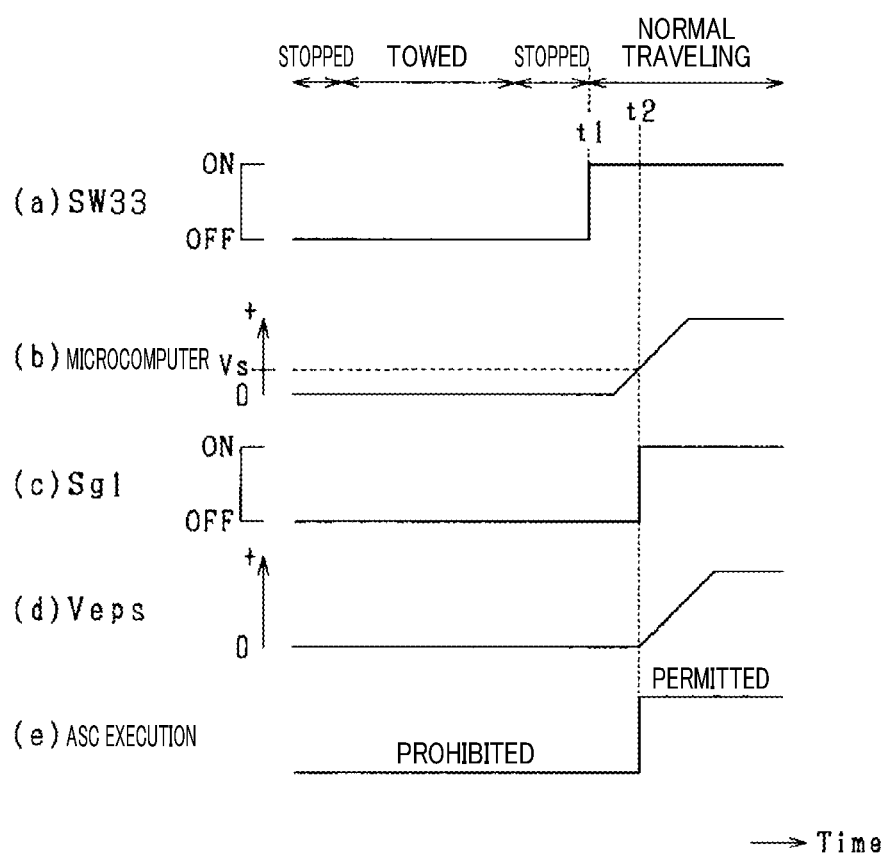
FIG. 11 is a timing chart illustrating a startup aspect of an abnormality power supply.

Control according to the present embodiment will be described with reference to FIG. 11. FIG. 11(a) shows the operating state of the start switch 33. FIG. 11(b) shows transitions in the lower-arm drive voltage VdL. FIG. 11(c) shows transitions in the startup signal Sg1. FIG. 11(d) shows transitions in the abnormality drive voltage Veps. FIG. 11(e) shows the ASC control permitted/prohibited state.

At time t1 during vehicle-stopping, the start switch 33 is turned on. Before time t2, the control unit 80a determines that neither of the first condition and the second condition is met. Therefore, the abnormality power supply 80 is not operating. In this state, even when the output voltage VH from the smoothing capacitor 24 is supplied to the abnormality power supply 80 as a result of the towing of the vehicle 10, the abnormality drive voltage Veps does not increase. Consequently, electric power cannot be supplied to the lower-arm drive unit 72a and execution of ASC control can be effectively prevented.

Here, at time t2 during normal traveling, the lower-arm drive voltage VdL reaches the determination voltage Vs and the logic of the startup signal Sg1 is set to H. The control unit 80a determines that the control system has been started by at least either of the first and second conditions being met. As a result, the control unit 80a switches the ASC control prohibited state to the permitted state, and starts the abnormality power supply 80.

According to the present embodiment described above, the control unit 80a starts the abnormality power supply 80 in response to the control system being started. Therefore, before startup of the control system, the abnormality power supply 80 is not operating. In this case, electric power for performing ASC control is not supplied to the gate of the lower-arm switch SWL. Thus, ASC control is not performed. Consequently, ASC control can be accurately prevented from being performed during the towing of the vehicle 10. Furthermore, the inverter 20 can be accurately prevented from entering an overheated state during the towing of the vehicle 10.

<Modifications According to the Third Embodiment>

Instead of the configuration in which both the control unit 80a and the determining unit 81 determine the ASC control permitted/prohibited state, the configuration may be such that the control unit 80a, of the control unit 80a and the determining unit 81, determines the ASC control permitted/prohibited state. In this case, the control unit 80a corresponds to the "startup determining unit."

The control unit 80a may determine that the control system has been started using either of the startup signal Sg1 and the lower-arm drive voltage VdL. For example, when determined that the lower-arm drive voltage VdL has reached the determination voltage Vs, the control unit 80a may determine that the control system has been started. As a result of this configuration, a configuration that transmits to the control unit 80a that the control system has been started is not required to be added separately from the insulating power supply 70. Consequently, a number of components of the control circuit 50 can be reduced.

Fourth Embodiment

A fourth embodiment will be described below, mainly focusing on differences with the third embodiment.

Figure 12:
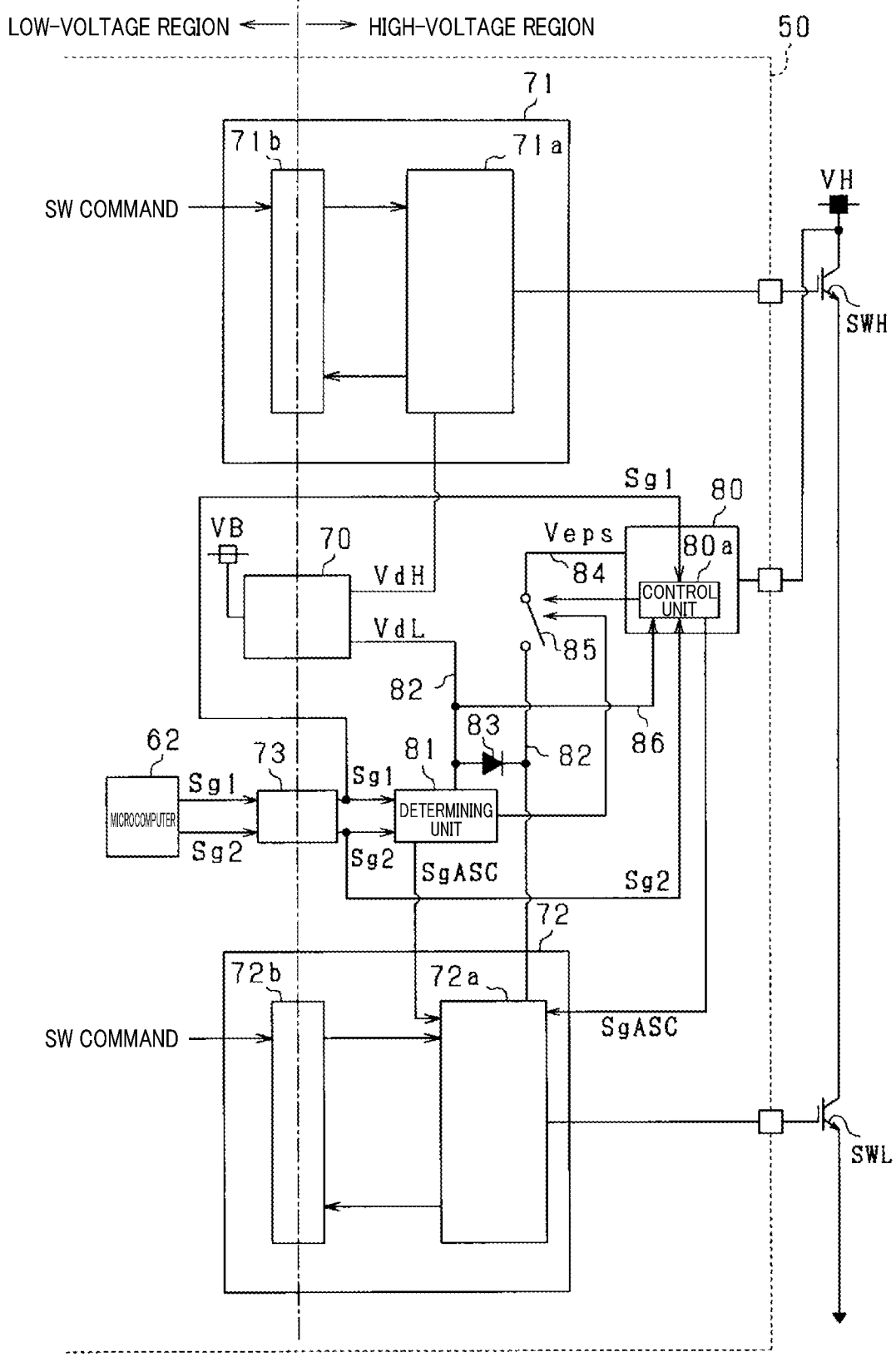
FIG. 12 is a diagram illustrating upper- and lower-arm drive units and peripheral configurations thereof according to a sixth embodiment

As shown in FIG. 12, the configuration may be such that the abnormality signal Sg2 that is outputted from the determination signal transmitting unit 73 is also inputted to the control unit 80a. The control unit 80a determines whether an abnormality has occurred in the control system by a process that is similar to the process in foregoing FIG. 5. Specifically, the control unit 80a determines whether at least either of the third condition that the logic of the inputted abnormality signal Sg2 is H and the fourth condition that the inputted lower-arm drive voltage VdL is less than the predetermined voltage Vp is met. When determined that neither of the third condition and the fourth condition is met, the control unit 80a determines that an abnormality has not occurred in the control system and outputs an off-command for the abnormality switch 85. Meanwhile, when determined that at least either of the third condition and the fourth condition is met, the control unit 80a outputs an on-command for the abnormality switch 85 and outputs the ASC execution command SgASC to the lower-arm drive unit 72a.

The determining unit 81 determines whether at least either of the third condition that the logic of the inputted abnormality signal Sg2 is H and the fourth condition that the inputted lower-arm drive voltage VdL is less than the predetermined voltage Vp is met. When determined that neither of the third condition and the fourth condition is met, the determining unit 81 determines that an abnormality has not occurred in the control system and outputs the off-command for the abnormality switch 85. Meanwhile, when determined that at least either of the third condition and the fourth condition is met, the determining unit 81 outputs the on-command for the abnormality switch 85 and outputs the ASC execution command SgASC to the lower-arm drive unit 72a.

According to the present embodiment, the abnormality switch 85 is switched to on as a result of the on-command being outputted to the abnormality switch 85 from both the control unit 80a and the determining unit 81. In addition, the lower arm switches SWL of the three phases are turned on as a result of the ASC execution command SgASC being outputted from both the control unit 80a and the determining unit 81.

According to the present embodiment, respective determination results from the control unit 80a and the determining unit 81 are used in the determination regarding whether ASC control is performed. Therefore, determination accuracy regarding whether an abnormality has occurred in the control system can be improved.

<Modifications According to the Fourth Embodiment>

Instead of the configuration in which both the control unit 80a and the determining unit 81 determine whether to perform ASC control, the configuration may be such that the control unit 80a, of the control unit 80a and the determining unit 81, determines whether to perform ASC control. In this case, the control unit 80a corresponds to the "abnormality determining unit" and the "short-circuit control unit."

The control unit 80a may determine that the control system has been started using either of the startup signal Sg1 and the lower-arm drive voltage VdL. For example, when determined that the lower-arm drive voltage VdL is less than the predetermined voltage Vp, the control unit 80a may determine that an abnormality has occurred in the control system. As a result of this configuration, a configuration that transmits to the control unit 80a that an abnormality has occurred in the control system is not required to be added separately from the insulating power supply 70. Consequently, the number of components of the control circuit 50 can be reduced.

The control unit 80a may perform determination regarding whether ASC control can be performed at a predetermined control cycle, in a manner similar to the configuration described with reference to foregoing FIG. 8.

Other Embodiments

The cooling apparatus 40 may not be provided in the control system.

The switch that configures the inverter 20 is not limited to the IGBT and may be an N-channel metal-oxide-semiconductor field-effect transistor (MOSFET).

The controlled variable of the rotating electric machine 11 is not limited to torque and, for example, may be a rotation speed of the rotor 12 of the rotating electric machine 11.

The control unit and a method thereof described in the present disclosure may be actualized by a dedicated computer that is provided such as to be configured by a processor and a memory, the processor being programmed to provide one or a plurality of functions that are realized by a computer program. Alternatively, the control unit and a method thereof described in the present disclosure may be actualized by a dedicated computer that is provided by a processor being configured by a single dedicated hardware logic circuit or more. Still alternatively, the control unit and a method thereof described in the present disclosure may be actualized by a single dedicated computer or more. The dedicated computer may be configured by a combination of a processor that is programmed to provide one or a plurality of functions, a memory, and a processor that is configured by a single hardware logic circuit or more. In addition, the computer program may be stored in a non-transitory computer-readable (tangible) recording medium that can be read by a computer as instructions performed by the computer.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

What is claimed is:

1. A control circuit for a power converter that configures a system that is mounted to a vehicle and includes a rotating electric machine that has multiple phases and includes a rotor that is capable of transmitting power to and from a drive wheel, the power converter including upper- and lower-arm switches that are electrically connected to phase windings of the rotating electric machine, and the control circuit comprising:
    an abnormality determining unit that determines whether an abnormality has occurred in the system;
    a startup determining unit that determines whether the system has been started; and
    a short-circuit control unit that performs short-circuit control to turn on an on-side switch that is either one of the upper- and lower-arm switches and to turn off an off-side switch that is another of the upper- and lower-arm switches, in response to (i) the system being determined to have been started and (ii) the abnormality being determined to have occurred, wherein:
    the short-circuit control unit and the startup determining unit are provided in a high-voltage region;
    the system comprises
        a start switch that is operated by a user of the vehicle, instructs startup of the system by the start switch being turned on, and instructs stopping of the system by the start switch being turned off, and
        a low-voltage power supply that is provided in a low-voltage region that is electrically insulated from the high-voltage region;
    an insulating power supply is provided in the low-voltage region and the high-voltage region so as to straddle a boundary between the low-voltage region and the high-voltage region, receives electric power supplied from the low-voltage power supply, in response to the start switch being turned on, and generates electric power that is supplied to respective gates of the on-side switch and the off-side switch; and
    the startup determining unit determines that the system has been started, in response to an output voltage of the insulating power supply being determined to be equal to or greater than a predetermined voltage.

2. The control circuit for the power converter according to claim 1, wherein:
    the abnormality determining unit is provided in the high-voltage region and determines whether the abnormality has occurred based on the output voltage of the insulating power supply.

3. The control circuit for the power converter according to claim 2, wherein:
    the abnormality determining unit determines that the abnormality has occurred in response to a voltage that is supplied from the insulating power supply to the gate of the on-side switch being less than a predetermined voltage.

4. The control circuit for the power converter according to claim 1, wherein:
the startup determining unit periodically performs a process for determining that a state is a short-circuit control permitted state in response to the system being determined to have been started, and determining that the state is a short-circuit control prohibited state in response to the system being determined to be not started; and
the short-circuit control unit performs the short-circuit control in response to the state being determined to be the permitted state, and the abnormality being determined to have occurred.

5. The control circuit for the power converter according to claim 1, further comprising:
a drive power supply that is provided in the high-voltage region and supplies electric power to the gate of the on-side switch, wherein:
the short-circuit control unit performs the short-circuit control using the electric power that is generated by the drive power supply; and
the drive power supply includes a power supply control unit that starts the drive power supply in response to the system being determined to have been started.

6. The control circuit for the power converter according to claim 5, wherein:
the power supply control unit periodically performs a process for determining that a state is a short-circuit control permitted state, in response to the system being determined to have been started, and determining that the state is a short-circuit control prohibited state, in response to the system being determined to be not started; and
the short-circuit control unit performs the short-circuit control in response to
the state being determined to be the permitted state by both the startup determining unit and the power supply control unit, and
the abnormality being determined to have occurred.

7. The control circuit for the power converter according to claim 1, wherein:
a drive power supply is provided in the high-voltage region and supplies electric power to the gate of the on-side switch;
the short-circuit control unit performs the short-circuit control using the electric power that is generated by the drive power supply;
the drive power supply includes a power supply control unit that starts the drive power supply in response to the system being determined to have been started; and
the power supply control unit
determines that the system has been started, in response to the output voltage of the insulating power supply being determined to be equal to or greater than the predetermined voltage, and
starts the drive power supply in response to the system being determined to have been started.

8. The control circuit for the power converter according to claim 7, wherein:
the power supply control unit determines whether the abnormality has occurred based on the output voltage of the insulating power supply; and
the short-circuit control unit performs the short-circuit control in response to
the abnormality being determined to have occurred by both the abnormality determining unit and the power supply control unit, and
the system being determined to have started.

9. The control circuit for the power converter according to claim 8, wherein:
the power supply control unit determines that the abnormality has occurred, in response to a voltage that is supplied from the insulating power supply to the gate of the on-side switch being less than a predetermined voltage.

10. The control circuit for the power converter according to claim 1, wherein:
the short-circuit control unit prohibits execution of the short-circuit control in response to stopping of the system being instructed.

11. A control circuit for a power converter that configures a system that is mounted to a vehicle and includes a rotating electric machine that has multiple phases and includes a rotor that is capable of transmitting power to and from a drive wheel, the power converter including upper- and lower-arm switches that are electrically connected to phase windings of the rotating electric machine, and the control circuit comprising:
an abnormality determining unit that determines whether an abnormality has occurred in the system;
a startup determining unit that determines whether the system has been started;
a short-circuit control unit that performs short-circuit control to turn on an on-side switch that is either one of the upper- and lower-arm switches and to turn off an off-side switch that is another of the upper- and lower-arm switches, in response to (i) the system being determined to have been started and (ii) the abnormality being determined to have occurred, wherein:
the system comprises
a start switch that is operated by a user of the vehicle, instructs startup of the system by the start switch being turned on, and instructs stopping of the system by the start switch being turned off;
the short-circuit control unit and the startup determining unit are provided in a high-voltage region;
a startup signal output unit is provided in a low-voltage region and outputs a startup signal by the start switch being turned on;
a startup signal transmitting unit is provided in the high-voltage region and the low-voltage region such as to straddle a boundary between the high-voltage region and the low-voltage region, and transmits the startup signal that is outputted from the startup signal output unit to the high-voltage region, while electrically insulating between the high-voltage region and the low-voltage region; and
the startup determining unit determines that the system has been started, in response to the startup signal being determined to be received through the startup signal transmitting unit.

12. The control circuit for the power converter according to claim 11, wherein:
the abnormality determining unit determines that the abnormality has occurred in response to a voltage that is supplied from the insulating power supply to the gate of the on-side switch being less than a predetermined voltage.

13. The control circuit for the power converter according to claim 11, wherein:

the startup determining unit periodically performs a process for determining that a state is a short-circuit control permitted state in response to the system being determined to have been started, and determining that the state is a short-circuit control prohibited state in response to the system being determined to be not started; and the short-circuit control unit performs the short-circuit control in response to the state being determined to be the permitted state, and the abnormality being determined to have occurred.

14. A control circuit for a power converter that configures a system that is mounted to a vehicle and includes a rotating electric machine that has multiple phases and includes a rotor that is capable of transmitting power to and from a drive wheel, the power converter including upper- and lower-arm switches that are electrically connected to phase windings of the rotating electric machine, and the control circuit comprising:

an abnormality determining unit that determines whether an abnormality has occurred in the system;

a startup determining unit that determines whether the system has been started; and a short-circuit control unit that performs short-circuit control to turn on an on-side switch that is either one of the upper- and lower-arm switches and to turn off an off-side switch that is another of the upper- and lower-arm switches, in response to (i) the system being determined to have been started and (ii) the abnormality being determined to have occurred, wherein:

the short-circuit control unit and the startup determining unit are provided in a high-voltage region;

the system comprises
  a start switch that is operated by a user of the vehicle, instructs startup of the system by the start switch being turned on, and instructs stopping of the system by the start switch being turned off, and
  a low-voltage power supply that is provided in a low-voltage region that is electrically insulated from the high-voltage region;

an insulating power supply is provided in the low-voltage region and the high-voltage region so as to straddle a boundary between the low-voltage region and the high-voltage region, and in response to the start switch being turned on, receives electric power supplied from the low-voltage power supply, and generates electric power that is supplied to respective gates of the on-side switch and the off-side switch;

a startup signal output unit is provided in the low-voltage region and outputs a startup signal by the start switch being turned on;

a startup signal transmitting unit is provided in the high-voltage region and the low-voltage region so as to straddle a boundary between the high-voltage region and the low-voltage region, and transmits the startup signal that is outputted from the startup signal output unit to the high-voltage region, while electrically insulating between the high-voltage region and the low-voltage region; and the startup determining unit determines that the system has been started, in response to
  an output voltage of the insulating power supply being determined to be equal to or greater than a predetermined voltage, and
  the startup signal being determined to be received through the startup signal transmitting unit.

15. The control circuit for the power converter according to claim 14, wherein:

the abnormality determining unit is provided in the high-voltage region and determines whether the abnormality has occurred based on the output voltage of the insulating power supply.

16. The control circuit for the power converter according to claim 14, wherein:

the abnormality determining unit determines that the abnormality has occurred in response to a voltage that is supplied from the insulating power supply to the gate of the on-side switch being less than a predetermined voltage.

17. The control circuit for the power converter according to claim 14, wherein:

the startup determining unit periodically performs a process for determining that a state is a short-circuit control permitted state in response to the system being determined to have been started, and determining that the state is a short-circuit control prohibited state in response to the system being determined to be not started; and the short-circuit control unit performs the short-circuit control in response to the state being determined to be the permitted state, and the abnormality being determined to have occurred.

18. The control circuit for the power converter according to claim 14, wherein:

a drive power supply is provided in the high-voltage region and supplies electric power to the gate of the on-side switch;

the short-circuit control unit performs the short-circuit control using the electric power that is generated by the drive power supply;

the drive power supply includes a power supply control unit that starts the drive power supply in response to the system being determined to have been started; and the power supply control unit
  determines that the system has been started, in response to the output voltage of the insulating power supply being determined to be equal to or greater than the predetermined voltage, and
  starts the drive power supply in response to the system being determined to have been started.

* * * * *